Figure 2:
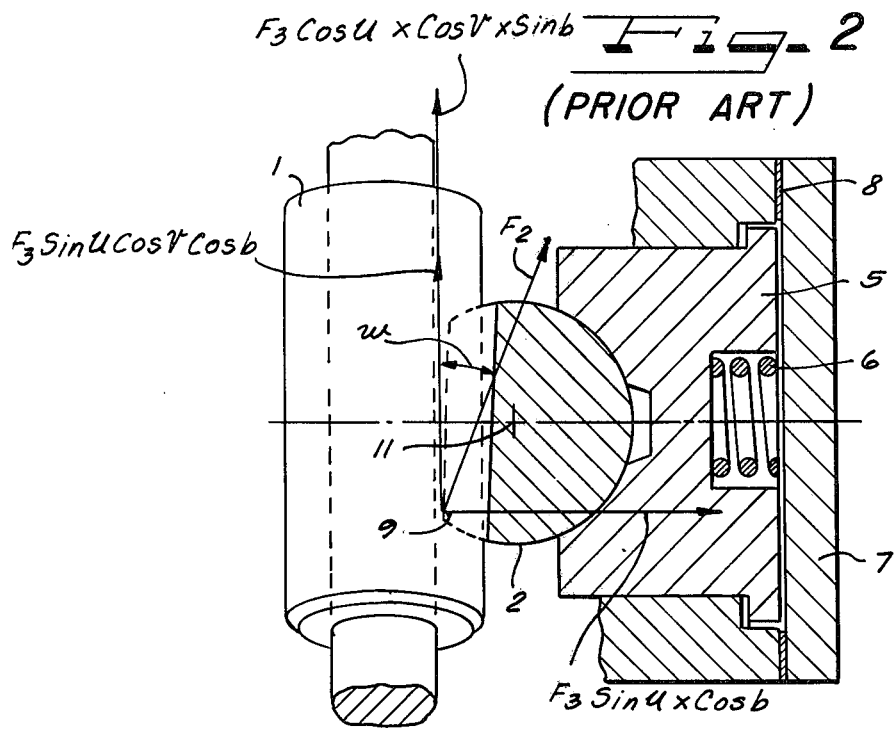

United States Patent [19]
Bishop

[11] 4,116,085
[45] Sep. 26, 1978

[54] RACK AND PINION STEERING GEAR

[76] Inventor: Arthur Ernest Bishop, 17 Burton St., Mosman, New South Wales, Australia

[21] Appl. No.: 752,802

[22] Filed: Dec. 20, 1976

[30] Foreign Application Priority Data

Dec. 31, 1975 [AU] Australia .............................. PC4436

[51] Int. Cl.² ............................ B62D 1/20; F16H 1/18
[52] U.S. Cl. ........................................ 74/422; 74/498
[58] Field of Search ................................. 74/422, 498

[56] References Cited

U.S. PATENT DOCUMENTS

| | | | |
|---|---|---|---|
| 2,579,195 | 12/1951 | Kurtz et al. | 74/422 X |
| 3,572,158 | 3/1971 | Adams | 74/422 X |

FOREIGN PATENT DOCUMENTS

| | | |
|---|---|---|
| 2,122,892 | 1/1972 | France. |
| 2,049,386 | 10/1970 | Fed. Rep. of Germany. |
| 976,661 | 12/1964 | United Kingdom ..................... 74/498 |

Primary Examiner—Allan D. Herrmann
Attorney, Agent, or Firm—Hill, Gross, Simpson, Van Santen, Steadman, Chiara & Simpson

[57] ABSTRACT

A rack and pinion steering gear having a helical pinion engaging a rack, the rack being spring urged into engagement with the pinion and having a pair of longitudinal guide faces angularly inclined to the median longitudinal plane of the rack, one each side, the rack being supported by guide means contacting the longitudinal guide faces and arranged so that the common normals passing through the points of contact or passing through the centers of the areas of contact between the guide means and the guide faces intersect at a point displaced from the centroid of the rack section towards the pinion center-line, so as to promote rolling of the rock when poor distribution of load across the rack occurs.

6 Claims, 5 Drawing Figures

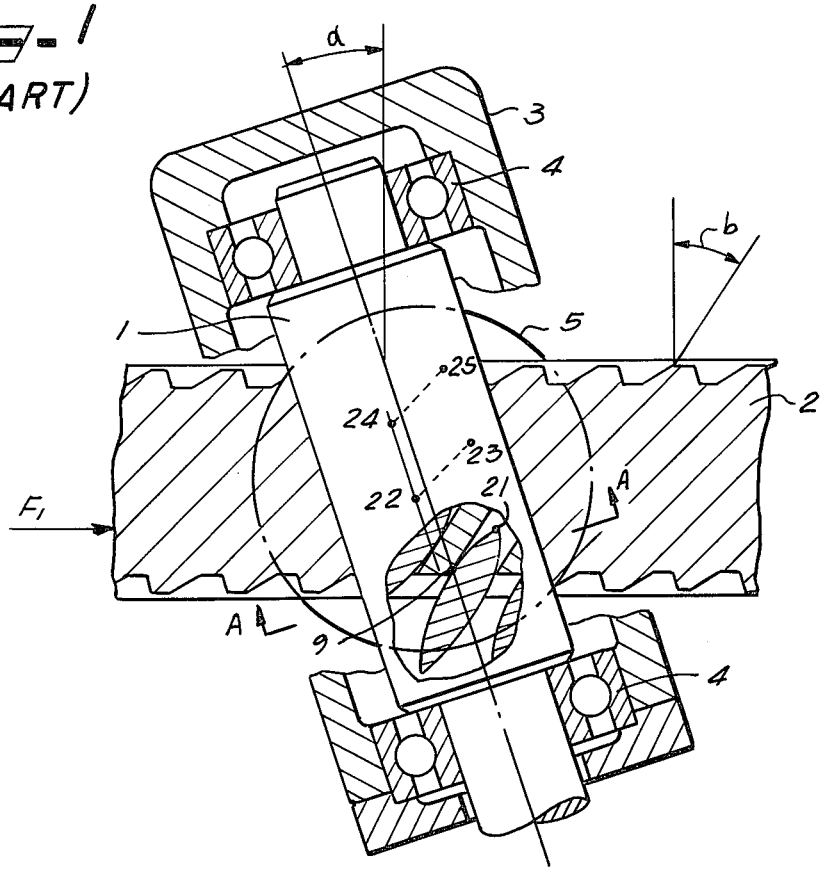
Fig. 1 (PRIOR ART)
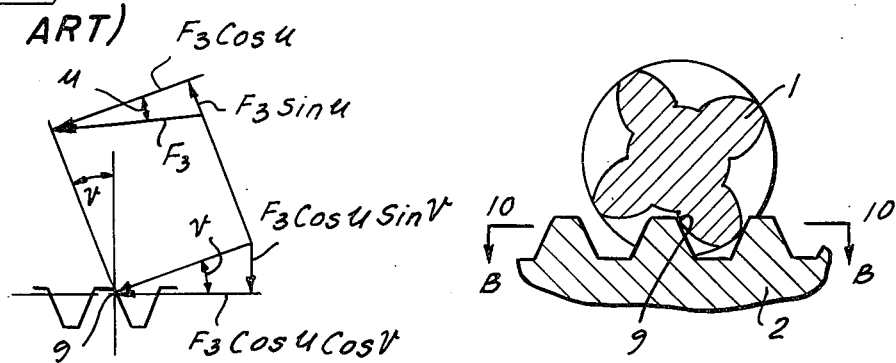
Fig. 5 (PRIOR ART)
Fig. 3 (PRIOR ART)

RACK AND PINION STEERING GEAR

This invention realtes to rack and pinion steering gear, and more particularly, to steering gear for manual steering rather than for power steering.

In manual steering gears, low steering efforts are generally preferred and hence a high ratio is used, which requires the use of a small pinion. Typically, it is not practical to achieve the desired ratio merely by reducing pinion diameter, in that it becomes too weak to sustain high road-shock loads which are transmitted to the rack bar by the suspension.

The commonly used device is to arrange the pinion to lie at an oblique angle (installation angle) to the normal to the rack centre line rather than at right angles thereto, and to employ rack teeth of opposite obliquity, i.e., with the teeth arranged at some angle (rack skew angle) inclined on the opposite side of the normal to the centre-line just referred to. A pinion made according to this principle will have a helix angle (which is the sum of these two angles) which may be as great as 55° to 60°. The action of such a pinion in driving the rack may to a degree be likened to that of a screw or worm.

It is also claimed by proponents of this principle that the loads are transmitted from the rack to the pinion (and vice versa) by the several teeth simultaneously engaged, which is not the case, for example, if substantially straight pinion teeth are used, and hence that high helix pinions are significantly stronger. This theoretical advantage is not achieved in practice, and it is one object of the present invention to overcome this limitation of the present state of the art.

In high helix pinions some of the theoretical gain due to sharing of the load by several teeth is lost because the bending load normal to the teeth increases by the secant of the skew angle of the rack teeth. This loss which is somewhat minor, is sometimes offset by using coarser teeth than would otherwise be used. However the incidence of failure in the teeth of racks and pinions where high helix angles are used is not primarily related to tooth strength, but to a jacking or locking tendency, which occurs under high road shock conditions. Examination of failed components shows that this usually affects the corner of one tooth only of the usually two or three teeth simultaneously engaged, showing that the theoretical sharing of the load does not occur. Three reasons are apparent for this:

1. Manufacturing tolerances make it impractical to achieve perfect meshing of the pinion to the rack across the full width and hence between the several teeth simultaneously engaged.
2. The pinion is relatively weak in torsion and hence tends to "wind" under load, making that end of the teeth nearest the driver carry most of the load.
3. The rack rotates about its axis under high-load conditions because of the high transverse loads associated with high helix angles, so locallising the load to a single tooth, near its end. The rack support, usually spring-loaded and capable of a few thousands of an inch movement, moves back under such conditions. Friction rises under conditions of point contact between teeth, so increasing the rolling of the rack to such an extent that a locking condition may develop.

Now the disadvantage of having the rack roll has been recognised in certain prior inventions in this field, for example: British Pat. No. 976,661 and U.S. Pat. No. 3,554,048, which shows the use of various guide systems designed to prevent rotation of the rack-bar under transverse forces. It is believed that these systems have never been used, and this could be because they deal only with the last of the three causes recited above, and not the former two. The present invention provides a steering gear which, though superficially appearing somewhat similar to the construction described in the patents referred to, seeks to exploit the rolling of the rack rather than to control it and simultaneously to deal with all three causes of load localisation.

The core of the present invention is to arrange the tack support in such a manner as to promote rolling of the rack when poor distribution of load across the width of the rack occurs, (or at least, to reduce the effect of the high transverse forces in producing undesirable rolling of the rack) by shifting the axis of rotation of the rack in its guide above, or at least towards the centre-line plane of the height of the teeth.

Thus the present invention consists in a rack and pinion steering gear comprising a helical pinion engaging a rack mounted substantially transverse to the axis thereof, rack support means for guiding the rack for longitudinal reciprocation, spring means urging the pinion and rack into mutual engagement, a pair of longitudinal guide faces on the rack angularly inclined to the median longitudinal plane of the rack, one each side, said guide faces being separated by a rib or corner, bearing means in the rack support means contacting the longitudinal guide faces of the rack, said guide faces being such that the common normals passing through the points of contact or passing through the centres of the areas of contact between the guide means and the guide faces intersect at a point displaced from the centroid of the rack section towards the pinion centre-line.

In order to attain a clearer understanding of this distinction it will be necessary later to refer to force diagrams. It suffices to note at this juncture, however, that the specification of the British and U.S. Patents referred to do not advocate such shifting of the axis of rotation of the rack bar in its guide, (should limited rotation occur despite the guiding) closer to the plane of origin of the transverse forces, namely, the pitch plane of the teeth. Both specifications actually illustrate at least one arrangement which shifts this axis away from this plane, so increasing the rolling couple.

On the other hand, in a rack and pinion steering gear made according to the present invention, the rolling couple can even be effectively reduced to zero by making the rack-bar support such as to have an instantaneous axis of rotation which lies within the plane which includes the pitch plane of the teeth. It is in this plane that the principal transverse forces originate.

A further advantage provided by the invention relates to the more efficient use of material, and hence saving of cost. In conventional practice the rack rod is a round bar of steel, which has a flat machined thereon and the teeth cut therein on that part of the rod where the pinion engages, (as illustrated in section in FIG. 2). The proportions shown here are typical of those widely used, and it will be noted that the strength of the rack bar in bending, for example, at the root of the teeth, has been reduced to less than half of the original round bar.

Figure 4:
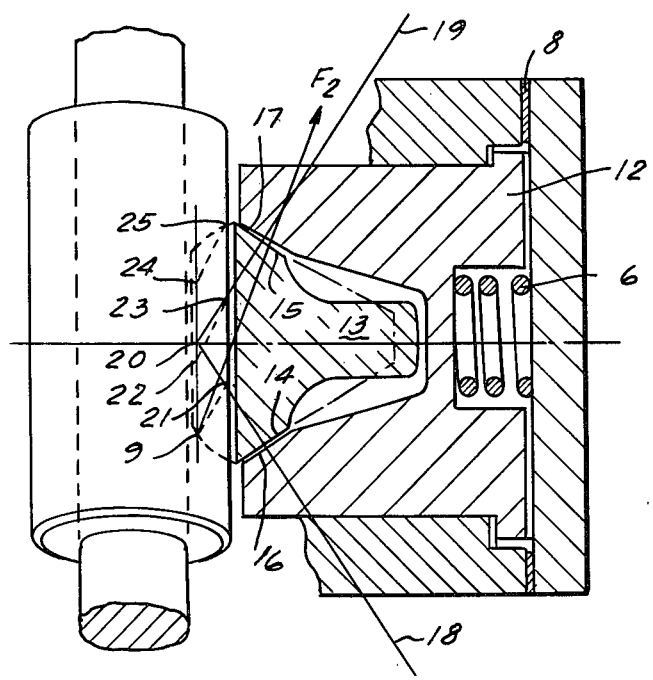

In contrast to this, a rack bar made according to the invention and as illustrated in section in FIG. 4 has its strength only slightly diminished by the cutting of the teeth. This section may be cold drawn to the section shown over its full length, or alternatively, forged to this shape over just that section where the teeth are cut. Alternatively, though of somewhat less advantage in weight for strength, an equilateral triangle having rounded corners may be used for the section of the bar as shown chain-dotted.

In order that the invention may be better understood and put into practice a preferred embodiment thereof is hereinafter described, by way of example, with reference to the accompanying drawings in which:

FIG. 1 is a plan view of a conventional pinion and rack including a part-sectional view on line B—B of FIG. 3, FIG. 2 is a sectional elevation thereof, FIG. 3 is a section on line A—A of FIG. 1, FIG. 4 is a sectional elevation corresponding to FIG. 2 of an arrangement according to the present invention, and FIG. 5 is a vector diagram illustrating the forces acting between the rack and pinion.

These figures (enlarged about 1½ times from actual size) illustrate a typical steering gear in which the installation angle 'a' is 18° and the rack skew angle 'b' is 35°. The pinion has four teeth and an outside diameter of 0.800. The rack teeth are 12 DP in normal section and have a pressure angle 'v' of 20°.

Pinion 1 meshes with rack 2, and is journalled in housing 3 in ball bearings 4,4. Rack guide or yoke 5 slides in housing 3 under the action of spring 6, which urges the rack into slackfree engagement with the pinion under a load of about 35 Kg. It is important that yoke 5 is limited in its travel to just that needed to accommodate the manufacturing errors in the rack and pinion teeth which results in some rise and fall of the rack, and to this end shim 8 which spaces cover 7 from the housing is selected at assembly to allow about 0.2 mm travel of the yoke.

Now, although the travel is small, it is nevertheless sufficient to allow movement of the rack from the pinion under high axial loads applied by the suspension to the ends of the rack, which is the condition illustrated in the positions of the respective parts in FIGS. 1 and 2 and 3. This movement may also be associated with rotation of the rack clockwise as in FIG. 2 and hence localisation of the entire load at one point on a rack tooth for example, as at 9. The pre-requisite for this rotation to occur will be that the resultant $F_2$ of all forces in the plane normal to the rack axis acting through the point of contact 8 passes to the left of the centre 11 of rack bar, prior to yoke 5 reaching cover 7, which intermediate position is here illustrated.

Resultant force $F_2$ may be traced to the forces applying at the point of contact illustrated in FIG. 5, which looks along the direction of the teeth and, in the associated scrap view, which looks at right angles thereto. Here $F_3$ is the tooth contact force normal to the contacting surfaces which would be the only force acting if there were no friction. If, however, a friction angle 'u' is assumed to exist, then the real force $F_3$ will be inclined to the normal at an angle 'u' and in a plane determined by the direction of sliding contact.

The particular instant shown in FIGS. 1, 3 and 5 is where meshing occurs in the pitch line of the pinion as in plane 10—10 of FIG. 3. As is well known in gearing, true rolling occurs in a non-helical spur gear pair at this instant and in its inclined-axis helical counterpart, only axial sliding occurs. This instant of meshing has been chosen as it is easiest to analyse, it is that associated with the greatest tendency of the rack to roll and it is where greatest bending of the rack tooth occurs.

Now the force between the teeth, $F_3$, may be resolved into $F_3$ Sin 'u' along the teeth and $F_3$ Cos 'u' along the common normal. Now $F_3$ Sin 'u' has a component $F_2$ Sin 'u' Cos 'b' in the plane normal to the rack centre line, tending to produce rolling of the rack bar as shown in FIG. 2. The normal force $F_3$ Cos 'u' has components $F_3$ Cos 'u' Cos 'v' Sin 'b' in the plane normal to the rack axis, passing through 9, tending to roll the rack clockwise, and $F_3$ Cos 'u' Sin 'v' tending to roll the rack anticlockwise. Now referring to FIG. 2, $F_2$, the resultant of the various rolling forces can be calculated, as can the angle 'w' which it acts. For the values stated previously for the gear teeth, and with 'u' assigned a value 0.15 then 'w' may be shown to have a value of approximately 21°. It follows that a large rolling moment will exist which will maintain the rack in the rolled condition shown, and hence point loading will occur. The friction co-efficient will rise, leading to a locking condition in which shock loads cannot be dissipated by rotation of the pinion and hence the steering wheel.

Now consider FIG. 4 which shows a rack made according to the invention, and subject to the same high-load conditions shown for the conventional arrangement in FIGS. 1, 2, 3 and 5. Tooth proportions have been kept the same, so that FIGS. 1, 3 and 5 still apply. Yoke 12 and rack 13 are modified compared to yoke 5 and rack 2, but all other parts remain unchanged. It is to be noted that the flanks of the teeth of the rack, as seen in the section of FIG. 4 meet the faces 14 and 15 at an obtuse angle adjacent the roots of the teeth.

Rack 13 has a Y form in section as illustrated, (or may, alternatively, be an equilateral triangle as shown chain dotted) and is journalled for axial reciprocation in yoke 12 on two inclined faces 14 and 15 of the rack and slightly convex faces 16 and 17 of the yoke. These convex faces have centres of curvature in section 18 and 19, so that the common normals through the points of contact in section are 18–20 and 19–20 define a rolling axis of the rack bar at 20. It would be feasible to make faces 14 and 15 convex and faces 16 and 17 flat if desired.

As illustrated in FIG. 4, high axial forces applied to the rack bar by the suspension have caused the rack to drive the yoke towards cover 7 in opposition to spring 6 and hence contact between 14 and 16 has ceased.

Now if momentary rolling of the rack clockwise occurred and contact conditions similar to those shown in FIG. 2 develop resultant force $F_2$ would pass to the right of point 20 immediately rolling the rack counterclockwise and re-establishing distributed tooth loading of the teeth.

Now the real contact conditions between the rack and pinion are more complex for the case when the rack does not roll than in the point-loading case just described. Thus in FIGS. 1 and 4 dotted lines 9–21, 22–23 and 24–25 show where contact would occur if the load were evenly distributed, which, it will be recollected, is the ideal condition to be achieved in high-helix pinions. Moreover contact occurs over the entire height of the teeth rather than just in the pitch plane as shown in FIG. 3, and hence the friction components are more difficult to analyze. However if all forces originating in the contact lines 9–21, 22–23, 24–25 are resolved in a plane parallel to the pinion axis and at right angles thereto, it is evident that the latter will always be roughly symmetrical about the rack centre line and hence will produce little rolling. However the horizontal components must always lie in the plane of the teeth and therefore the rack roll centre should be located in this plane. Thus by shifting the roll axis of the rack from 11 in FIG. 2 to 20 in FIG. 4, localisation of the load as at 9 if it occurred, would instantly be relieved.

The sharing of the load between three teeth each of the rack and pinion is thus accomplished, greatly improving the ability of the system to sustain shocks.

Observe that, under high load, should 'wind' of the pinion occur, which otherwise would have resulted in localised contact occuring as previously described, the rack would slightly rotate so as to evenly distribute the load.

Similarly if a slight mis-match of angles occur due to manufacturing errors the rack will take up a position such as to evenly distribute the load.

The degree of curvature given to the yoke faces 16 and 17 will vary according to the degree of precision with which the parts are made, and the stiffness of the pinion in torsion, which factors require some rack rotation for tooth load equalisation, and, in some cases they may well initially be made flat surfaces. If they were so made the common normals could be considered as passing through the mid point of the contact line in the sectional view of each contact face. Because of the relative narrowness of these faces a small degree of curvature would quickly develop in the rack or yoke by wear, so that the slight degree of rolling needed would not be inhibited.

One way in which the rolling of the rack about point 20 would be improved would be to form rack faces 14 and 15 and yoke faces 16 and 17 as arcs of circles having centres at point 20. This arrangement would, however, be somewhat more difficult to manufacture, and is not preferred.

Note that it is not necessary, in order to achieve most of the benefits of the invention to exactly have the point 20 lie in the pitch plane, or even within the tooth height of the rack. Most of the benefits of the invention will accrue if point 20 is located not more than a distance equal to one half of the height of the teeth below the root of the teeth, and yet will be clearly distinguishable over the prior art, relating to round racks as illustrated in FIG. 2. In respect of the prior art referred to earlier relating to triangular section racks, the benefits of the invention will accrue if the point 20 is located clearly above, that is, towards the pinion, the centre or centroid of the section. Similarly the point 20 may be located at a height up to one half of the height of the teeth above the tops of the teeth.

I claim:

1. A rack and pinion steering gear comprising a helical pinion engaging a rack mounted substantially transverse to the axis thereof, rack support means for guiding the rack for longitudinal reciprocation, spring means urging the pinion and rack into mutual engagement, a pair of longitudinal guide faces on the rack angularly inclined to the median longitudinal guide faces on the rack angularly inclined to the median longitudinal plane of the rack on each side, guide means in the rack support means contacting the longitudinal guide faces of the rack, said guide faces being such that the common normals passing through the points of contact or passing through the centers of the areas of contact between the guide means and the guide faces intersect at a point displaced from the centroid of the rack section towards the pinion center-line.

2. A rack and pinion steering gear as claimed in claim 1 wherein the guide faces of the rack are substantially flat and the bearing means in the rack support convex or vice versa.

3. A rack and pinion steering gear as claimed in claim 1 wherein the flanks of the teeth of the rack as seen in transverse cross-section meet the said guide faces at an obtuse angle adjacent the roots of the teeth.

4. The rack and pinion steering gear recited in claim 1 wherein said last named point is between the root of the teeth on said rack and the pinion center-line.

5. The rack and pinion steering gear recited in claim 1 wherein said last named point is less than a distance equal to the rack tooth height away from the rack tooth midheight.

6. The rack and pinion steering gear recited in claim 1 wherein said last named point is within the toothed area of the rack.

* * * * *